(12) United States Patent
Liu

(10) Patent No.: US 6,466,439 B2
(45) Date of Patent: Oct. 15, 2002

(54) HARD DISK EXTRACTING BOX

(76) Inventor: Shen-Yi Liu, No. 123, Hsin I Nan St., Tai Chung (TW)

(*) Notice: Subject to any disclaimer, the term of this patent is extended or adjusted under 35 U.S.C. 154(b) by 65 days.

(21) Appl. No.: 09/776,837

(22) Filed: Feb. 6, 2001

(65) Prior Publication Data

US 2002/0105780 A1 Aug. 8, 2002

(51) Int. Cl.[7] ................................................. G06F 1/16
(52) U.S. Cl. ........................ 361/687; 361/683; 361/686
(58) Field of Search .......................... 361/683–695, 361/679

(56) References Cited

U.S. PATENT DOCUMENTS

| | | | | |
|---|---|---|---|---|
| 5,442,513 A | * | 8/1995 | Lo ............................ | 361/685 |
| 5,563,767 A | * | 10/1996 | Chen ......................... | 361/685 |
| 5,694,290 A | * | 12/1997 | Chang ....................... | 361/685 |
| 6,166,901 A | * | 12/2000 | Gamble et al. ............. | 361/685 |
| 6,193,339 B1 | * | 2/2001 | Behl et al. ................. | 312/223.2 |

* cited by examiner

Primary Examiner—Darren Schuberg
Assistant Examiner—Yean-Hsi Chang
(74) Attorney, Agent, or Firm—Rosenberg, Klein & Lee

(57) ABSTRACT

A hard disk extracting box is formed by a box seat and a box cover. The box seat is formed by a box body. An outer side of each lateral plate of the box body is installed with a protruded track which is matched with a guiding stripe at the supporting frame. Each lateral plate of the box seat is installed with a track groove; and each of two lateral sides thereof is installed with an inward folded embedding edge which is engagable with the track groove of the box cover. The front cover is extended rearwards with a buckling plate; the buckling plate has a hook; and the box cover is installed with a block with a buckling hole therein so that by the buckling hole to be engaged with the buckling plate. If the buckling plate is pressed, then the engagement is released.

4 Claims, 5 Drawing Sheets

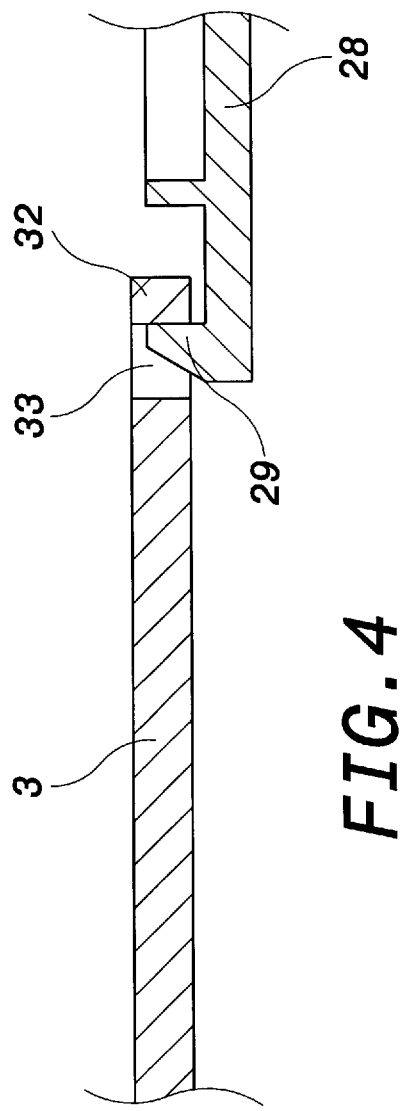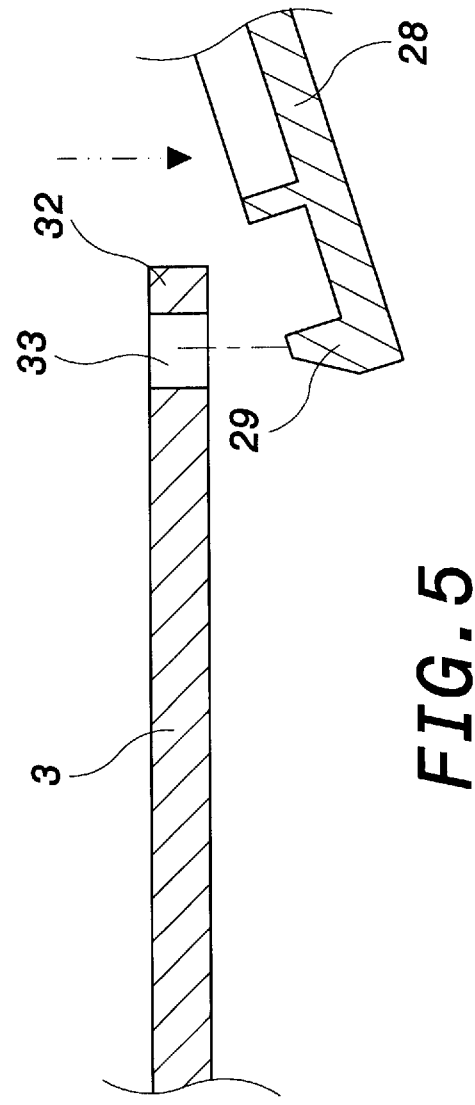

HARD DISK EXTRACTING BOX

FIELD OF THE INVENTION

The present invention relates to a hard disk extracting box, and especially to structure for conveniently placing or pull out a hard disk in the hard disk box.

BACKGROUND OF THE INVENTION

In the prior art, a computer is fixed to a hard disk frame of a mainframe so that the hard disk can not be moved or updated. However, with the increase of the capacitor of a hard disk, the amount of data is also increased. The way of fixing a hard disk within a mainframe is not suitable to the users. If the data is desired to be sent from one mainframe to another mainframe. A disk is required. But if the amount of data is larger than the capacitor of a disk, then it can not be copied at one time. In this case, the hard disk is necessary to be detached to another mainframe for duplication. Since the work of detaching a hard disk is difficult, an extractable hard disk is developed, Thereby, a hard disk can be detached from a mainframe easily. That is to say, data is portable with the extractable hard disk.

In general, an extractable hard disk is formed by a hard disk supporting frame and a hard disk supporting frame is made with respect to the width of the hard disk locating frame. The hard disk is inserted thereinto along the guiding of the guide strip of a fixture. The supporting frame is locked to the casing. The locating frame has two lateral plates, a front fame plate, a rear frame plate. The front frame plate has a guide door for being inserted into the hard disk extracting box, a turnable shielding plate and a locking unit. The rear frame plate is installed with a connector connecting to the mainframe and a connector connecting to a hard disk extracting box. Respectively, a connector is installed at a position with respect to a rear end surface of the hard disk extracting box for being directly connected to the connector of the hard disk supporting frame. Therefore, as the hard disk extracting box is inserted, then the box is connected with a matched connector. Therefore, the computer can be operated directly. The connectors, connecting buses, and power wires of the hard disk are connected to the connectors of the hard disk extracting box. Therefore, all the constructions can be operated conveniently, The configuration of the hard disk with respect to the hard disk extracting box is another problem. Referring to FIG. 1, a prior art structure is illustrated, which is disclosed by the applicant of the present invention. The hard disk extracting box 1a has a box seat 2a and a box cover 3a. The box seat 2a is formed by a box body 21a having a bottom plate 22a and two lateral plates 23a, a front cover 24a, and a rear cover 25a. The outer sides of the two lateral plates 23a are installed with protruded tracks 26a for matching the guiding strips at the inner sides of the lateral sides of a hard disk supporting frame. Thus, the hard disk extracting box 1a can be inserted into or pulled away from the hard disk extracting box 1a. Each lateral plate 23a of the box seat 2a is installed with a track groove 27a. Two lateral sides of the box cover 3a each are installed with embedding edges 31a facing inwards. By the matching of the embedding edge 31a with the track groove 27a, the box cover 3a is connected to the box body 2a. The top of the front cover 24a is transversally extended with a buckling plate 28a toward the back side. The buckling plate 28a has a hook 29a. The front end of the box cover 3a is installed with a buckling hole 33a so that the hook 29a may position the buckling hole 33a. Pressing the buckling plate 28a, the buckling connection can be released.

Since the buckling plate 28a is a thin plate, and is protruded from the box 2a. The most portion of the box 2a serves to place a hard disk 5a. The hard disk 5a has a form of square block and is heavy. After being used for a time period, it will discover that the position of the buckling plate 28a is not beneficial for the insertion and pulling of the hard disk drive. It is possible that the buckling plate is broken by accident. If the buckling plate 28a is broken, then the box cover 3a will lose the function of positioning.

SUMMARY OF THE INVENTION

Accordingly, the primary object of the present invention is to provide a hard disk extracting box, wherein under the condition that the function of the buckling plate (in the front cover of the box seat) to position the box cover is retained, the buckling plate is made with a structure of no protrusion so as to be engaged with a protrusion of the box cover. Therefore, the event that the buckling plate is broken is prevented. Furthermore, a pair of heat dissipating fans are installed in the front cover for resolving the problem that the buckling plate is protruded out, meanwhile, a preferred heat dissipating function is provided to the hard disk. In the present invention, the assembly of a hard disk is more convenient and the parts will not be destroyed by accident.

To achieve the aforesaid object, the present invention provides a hard disk extracting box installed in the hard disk supporting frame of an extractable hard disk attached to a computer casing. The hard disk extracting box is formed by a box seat and a box cover. The box seat is formed by a box body with a bottom plate and two lateral plates, a front cover, and a rear cover. An outer side of each lateral plate of the box body is installed with a protruded track which is matched with a guiding stripe at an inner surface at each side of a supporting frame so that the hard disk extracting box may enter into or be pulled out from the supporting frame. Each lateral plates of the box seat is installed with a track groove; and each of two lateral sides thereof is installed with an inward folded embedding edge which is engagable with the track groove of the box cover so that the box cover is connected to the box body.

A top surface of the front cover is extended rearwards with a buckling plate and the buckling plate has a hook. A front end of the box cover is installed with a block with a buckling hole therein so that by the buckling hole to be engaged with the buckling plate, the front cover of the back surface is positioned. If the buckling plate is pressed, then the engagement is released. A pair of heat dissipating fan is installed at an interior of the front cover, so that a rear end surface of the heat dissipating fan is flushed with a rear surface of the front cover.

The various objects and advantages of the present invention will be more readily understood from the following detailed description when read in conjunction with the appended drawing.

BRIEF DESCRIPTION OF THE DRAWINGS

FIG. 4 is a partial cross sectional view of FIG. 2 in the present invention.

FIG. 5 is a cross sectional view showing that a buckling condition of FIG. 4 is released in the present invention.

DETAILED DESCRIPTION OF THE PREFERRED EMBODIMENTS

Figure 1:
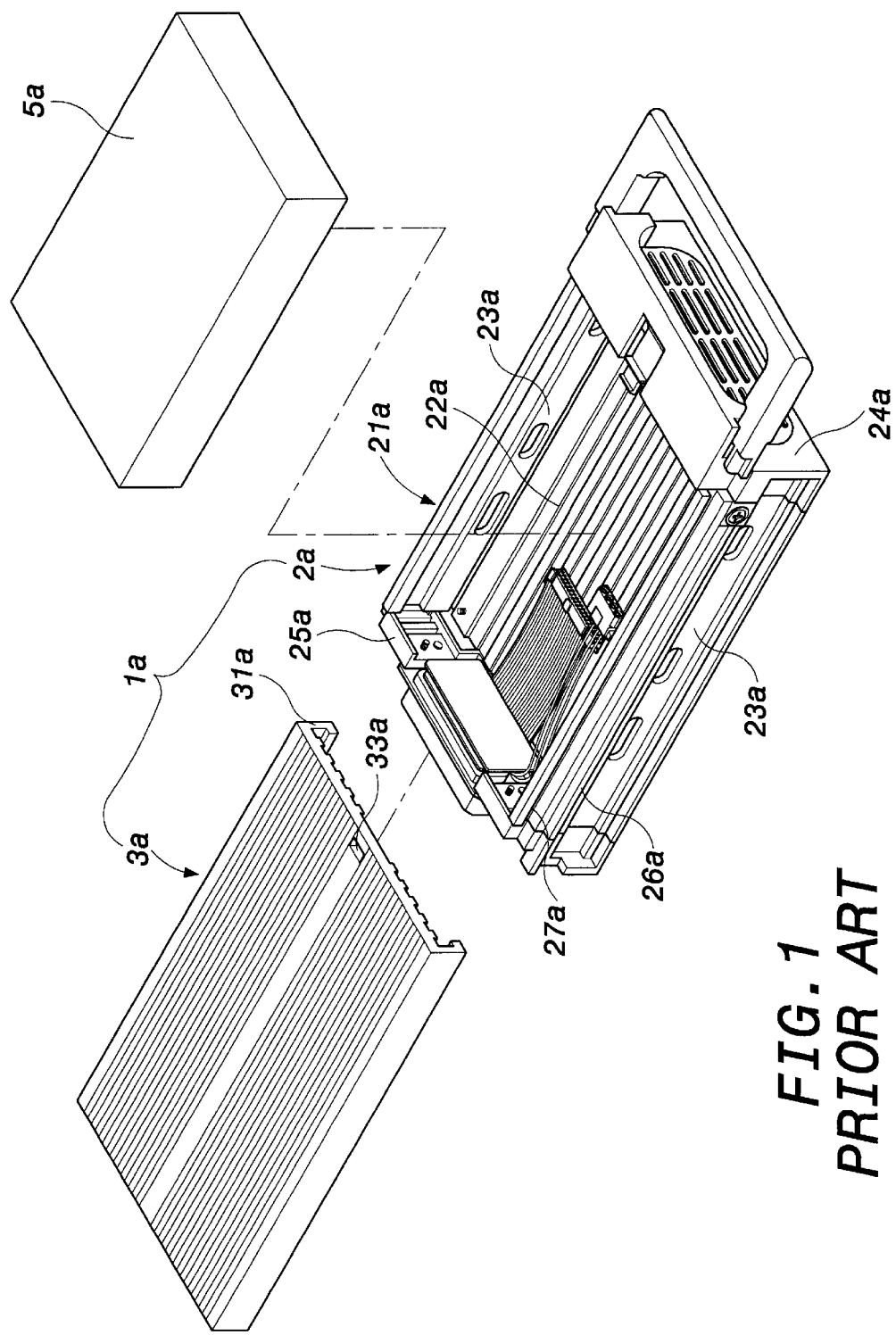
FIG. 1 is an exploded perspective view of a prior art design.
Figure 2:
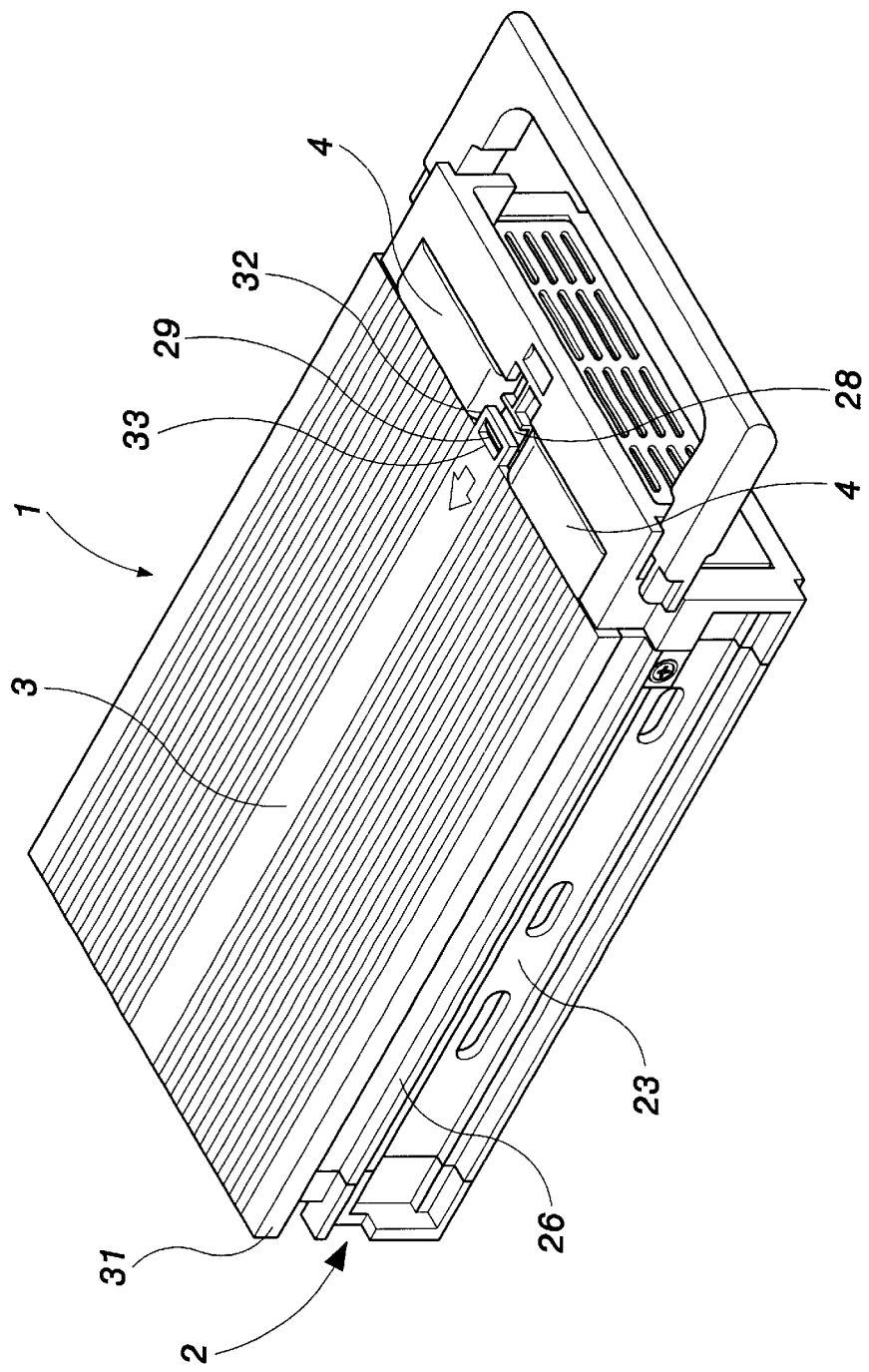
FIG. 2 is a perspective view of the present invention.
Figure 3:
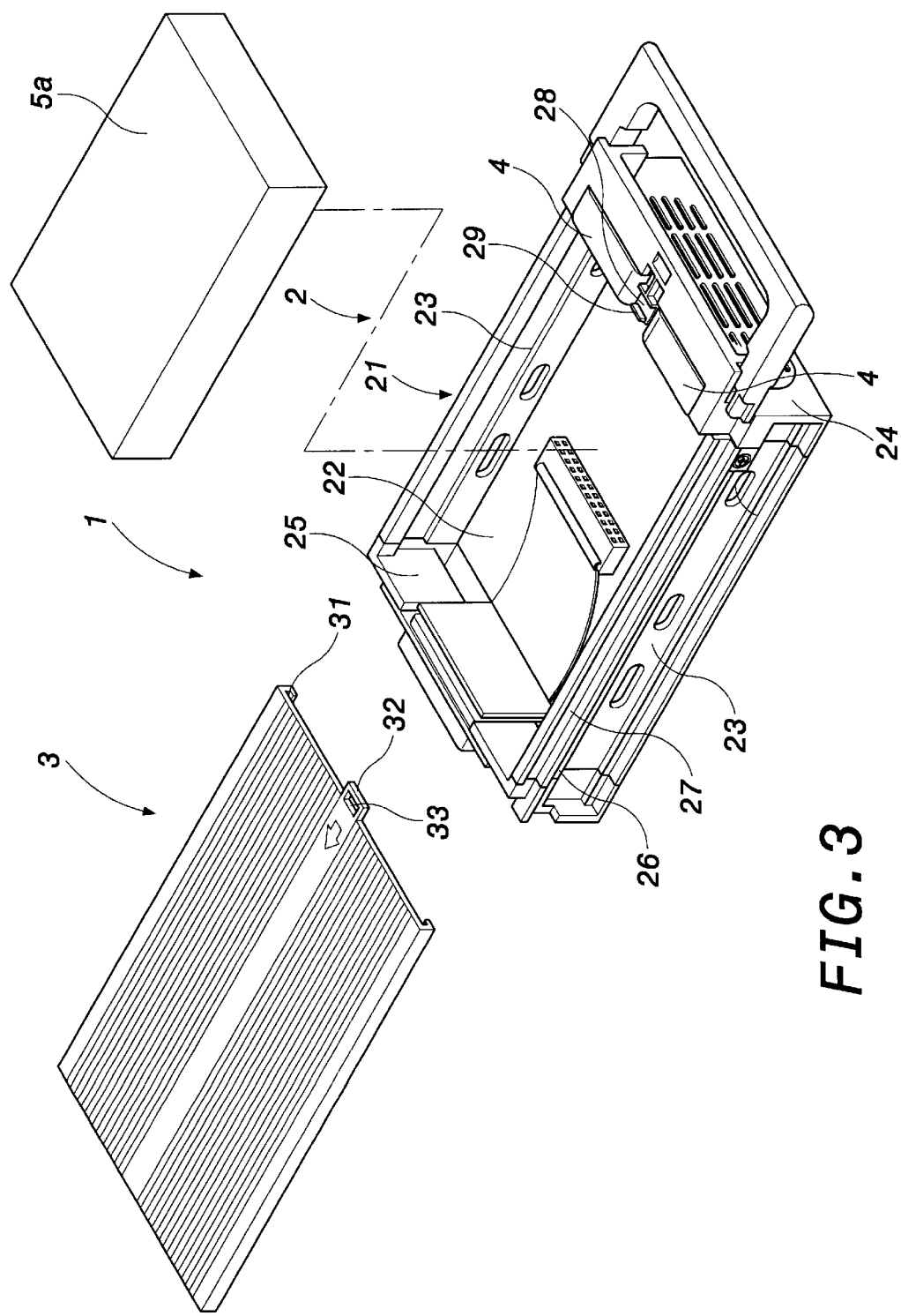
FIG. 3 is an exploded perspective view of the present invention.

In order that those skilled in the art can further understand the present invention, a description will be described in the following in details. However, these descriptions and the appended drawings are only used to cause those skilled in the art to understand the objects, features, and characteristics of the present invention, but not to used to confine the scope and spirit of the present invention defined in the appended claims.

Referring to FIGS. 2 to 5, the hard disk extracting box of the present invention is illustrated. The hard disk extracting box 1 has a box seat 2 and a box cover 3. The box seat 2 is formed by a box body 21 having a bottom plate 22 and two lateral plates 23, a front cover 24, and a rear cover 25. The outer sides of the two lateral plates 23 are installed with protruded tracks 26 for matching the guiding strips at the inner sides of the lateral sides of a hard disk supporting frame (not shown). Thus, the hard disk extracting box 1 can be inserted into or pulled away from the hard disk extracting box 1 along the guiding strips.

Each lateral plate 23 of the box seat 2 is installed with a track groove 27. Two lateral sides of the box cover 3 each are installed with embedding edges 31 facing inwards. By the matching of the embedding edge 31 with the track groove 27, the embedding edge 31 may slide along the track groove 27 so that the box cover 3 is connected to the box body 2. The top of the front cover 24 is transversally extended with a buckling plate 28. The buckling plate 28 has a hook 29. The front end of the box cover 3 is installed with a protrusion 32. A buckling hole 33 is installed in the protrusion 32 so that the hook 29 may position the buckling hole 33, as shown in FIG. 4. Pressing the root portion of the buckling plate 28, the buckling connection can be released, as shown in FIG. 5. The vertical surface of the inner end of the buckling plate 28 is flushed with the rear end of the front cover 24. A heat dissipating fan 4 is connected to the interior of the front cover 24. Therefore, in using the present invention, since the rear surface of the front cover 24 has provided with a preferred protection. When the hard disk 5 is vertically inserted into the box body 21, no harm to the buckling plate 28 occurs.

Figure 6:
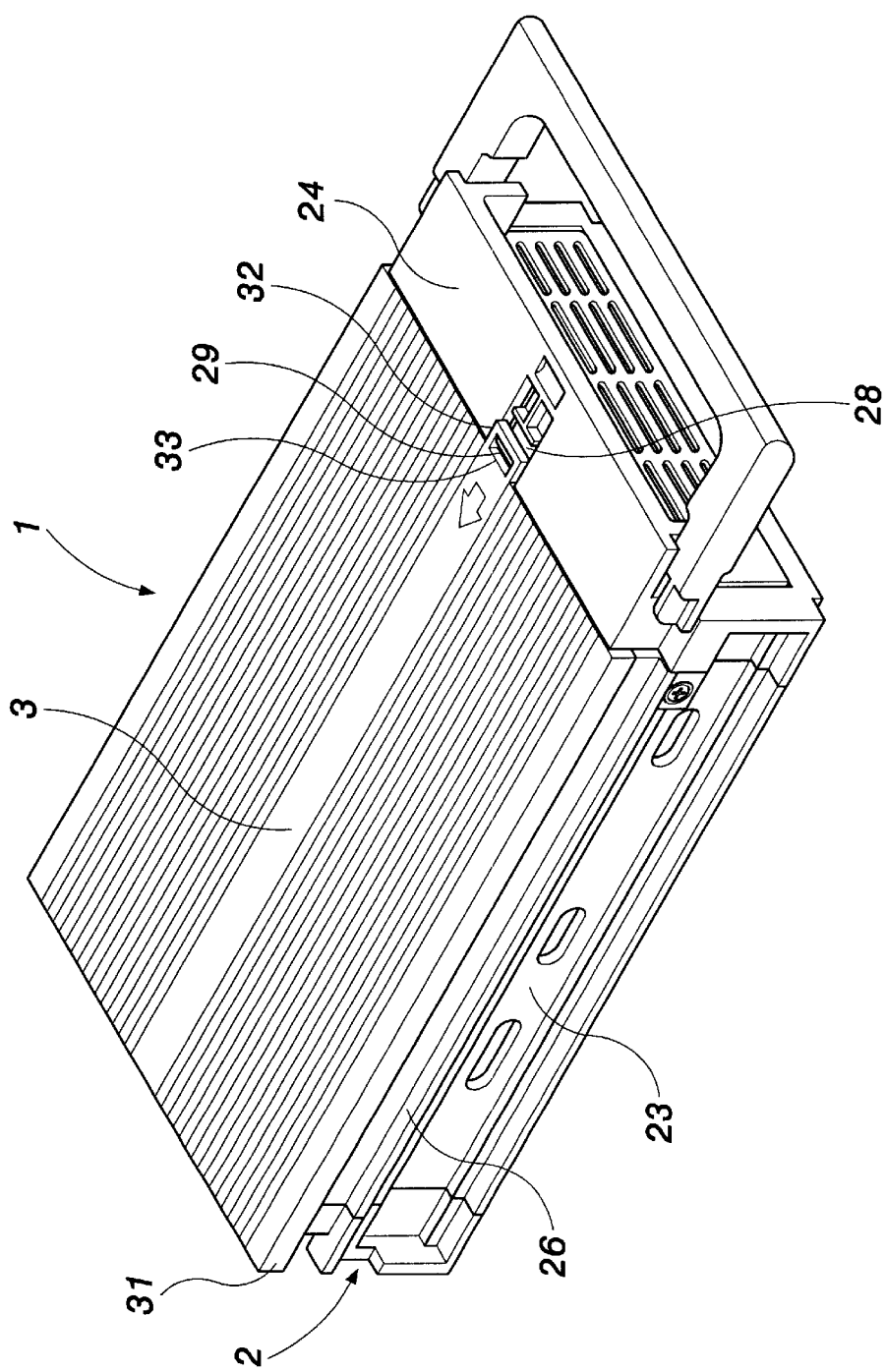
FIG. 6 is an exploded perspective view of another embodiment in the present invention.

As shown in FIG. 6, in the present invention, it is not the only means to protect the buckling plate 28 by the heat dissipating fan. Other ways may be provided, such as, using a pair of locking means to locking the cover at corresponding position. Or the rear end of the top of the front cover has a concave region so that the buckling plate is protected by the top of the front cover.

In summary, in the present invention, a fan is used to resolve the problem of protecting a buckling plate. Meanwhile, a fan is used to enhance heat dissipation. Since in general, the box and cover are made of aluminum extrusion, and the front cover and rear cover are made of plastics. Further, a control handle for being pulled or positioned is installed in the front cover. These components have their special functions for presenting a beautiful outlook and stability. Another, the hard disk extracting box of the present invention is a nearly closing space which has a bad effect to an operating hard disk drive. If a fan for heat dissipation is added, not only the problem of heat dissipating is resolved, but also the buckling plate can be protected, as two sides of the buckling plate are added with a respective buckling plate. Therefore, the present invention has dual effects. One design can be used to solve the aforesaid two problems.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A hard disk extracting box comprising:
   a box seat having a box body with a bottom plate and two lateral plates,
   a front cover, and a rear cover; each lateral plates of the box seat being installed with a track groove; a top surface of the front cover being extended rearwards with a buckling plate; the buckling plate having a hook; an inner vertical surface of the buckling plate being flushed with a rear end of the front cover; and
   a box cover; each of two lateral sides thereof being installed with an inward folded embedding edge which is engagable with the track groove of the box seat so that the box cover is connected to the box body; a front end of the box cover is installed with a block with a buckling hole therein so that by the buckling hole to be engaged with the buckling plate, the box cover is positioned; if the buckling plate is pressed, then the engagement is released.

2. The hard disk extracting box as claimed in claim 1, wherein an outer side of each lateral plate of the box body is installed with a protruded track which is matched with a guiding stripe at an inner surface at each side of a supporting frame.

3. The hard disk extracting box as claimed in claim 1, wherein the a heat dissipating fan is installed at an interior of the front cover, and a rear end surface of the heat dissipating fan is flushed with a rear surface of the front cover.

4. The hard disk extracting box as claimed in claim 1, wherein a front end surface of the block of the box cover is formed as an inward reduced tilt surface.

* * * * *